United States Patent [19]

Mattauch et al.

[11] 3,778,645

[45] Dec. 11, 1973

[54] SOLID-STATE SWITCHING CAPACITOR

[75] Inventors: Robert J. Mattauch; Thomas J. Viola, Jr., both of Charlottesville, Va.

[73] Assignee: The Rector and Visitors of the University of Virginia, Charlottesville, Va.

[22] Filed: Jan. 31, 1972

[21] Appl. No.: 222,210

[52] U.S. Cl. .............. 307/318, 307/320, 317/234 T, 317/234 UA, 331/177 V, 331/179, 332/30

[51] Int. Cl. .............. H01g 7/00

[58] Field of Search .............. 331/177 U, 179; 307/318, 320, 230; 317/234 T, 234 UA; 330/110

[56] References Cited

UNITED STATES PATENTS

| | | | |
|---|---|---|---|
| 3,223,946 | 12/1965 | Webb | 331/179 X |
| 3,056,073 | 9/1962 | Mead | 317/234 T |
| 3,295,070 | 12/1966 | Tewksbury et al. | 331/179 |
| 3,351,861 | 11/1967 | Martin et al. | 325/410 |
| 3,116,427 | 12/1963 | Giaever | 317/234 T |
| 3,275,844 | 9/1966 | Simmons | 317/234 T |

*Primary Examiner*—John W. Huckert
*Assistant Examiner*—William D. Larkins

[57] ABSTRACT

A capacitor structure comprising a first thin film tunneling capacitor in circuit with a resistor and a second capacitor wherein the capacitance value of said structure switches abruptly with applied bias potential.

10 Claims, 9 Drawing Figures

SOLID-STATE SWITCHING CAPACITOR

The present invention relates to capacitor circuits, and more particularly to capacitor circuits whose capacitance value is switchable abruptly with applied bias potential.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

In the field of signal processing there oftentimes exists a need for a switchable capacitor, that is, one whose capacitance value can be switched from one value to another abruptly. For example, in frequency shift keying applications, a capacitor or other frequency determining circuit element is switched in and out of circuit to control the operating frequency. The arrangements heretofore available have suffered various shortcomings. A need, therefore, exists for a relatively inexpensive and reliable circuit for achieving the same effect, that is, a circuit whose capacitance value can be changed to effect the change in operating frequency, all in response to an applied bias potential. To change frequency, one would need only to change the bias potential.

It is, therefore, an object of this invention to provide an improved switchable capacitor circuit device.

It is another object of the invention to provide an improved signal processing arrangement.

A further object of the invention is to provide a novel circuit consisting of a resistor and capacitor parallel pair placed in series with a circuit element of unique characteristic which exhibits the characteristics of a capacitor (that is, passing predominantly displacement current) for a given range of applied bias potential and the characteristics of a resistor (that is, passing predominantly conduction current) for bias potentials outside the above-mentioned range.

A still further object of the invention is to provide an improved method and means for producing a capacitive effect which is switchable under the control of a bias potential.

In accordance with one aspect of the invention, there is provided a circuit exhibiting a sudden and repeatable change in capacitance with a given value of voltage either positive or negative. The effect is obtained because of a series element which is a tunneling capacitor. The voltage at which the effect occurs and the change in capacitance can be changed by altering the physical dimensions of the tunneling capacitor.

BRIEF DESCRIPTION OF THE DRAWINGS

The aforementioned general objects and the various unique features of the present invention will be more clearly appreciated from the following description of a particular illustrative embodiment which is made in conjunction with the accompanying drawings wherein.

DETAILED DESCRIPTION OF THE PREFERRED EMBODIMENT

Figure 1:
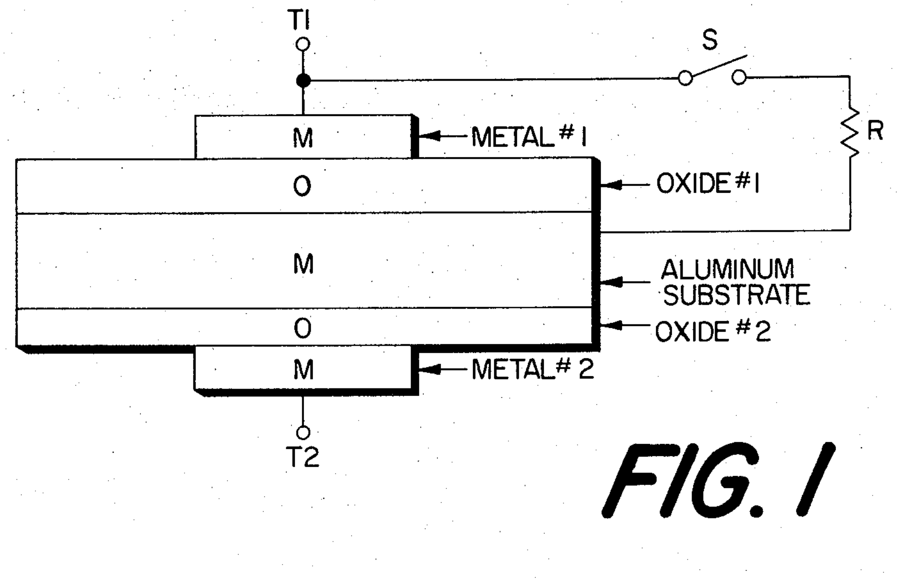
FIG. 1 illustrates a metal-oxide-metal-oxide-metal (MOMOM) capacitor structure in accordance with one embodiment of the present invention.

If one places a thin dielectric capacitor in series with a shunt conventional resistor-capacitor pair and if the thin dielectric capacitor has certain electrical properties, the resulting circuit will exhibit a capacitance the value of which will switch either reversibly or nonreversibly due to an applied DC potential across the entire structure.

The thin dielectric capacitor must have a dielectric sufficiently thin, generally less than 50 angstroms, so as to allow appreciable quantum mechanical tunneling to occur as a result of an applied bias potential. With this being the case, this element will pass both displacement and tunneling conduction current simultaneously. With zero applied bias, the element will pass current — the major portion of which is displacement current due to an applied small signal AC. As the DC potential bias across this element is increased, the quantum mechanical tunneling current increases exponentially with bias and has the nature of a conduction current. Since the displacement current flowing through the element due to the applied small signal AC has a magnitude which is invariant with applied DC bias potential, as the DC bias potential is increased the total current will become predominantly tunneling current which has the nature of conductive current through a resistor.

As a result of this effect of both displacement and conduction currents flowing and the conduction current magnitude being exponentially dependent on DC bias potential magnitude, this element appears to small signal AC as a capacitor for small values of applied DC potential. Beyond a certain DC bias potential $V_C$, the element appears as a very low resistance element. As is well-known, the value of the critical bias potential $V_c$ is a function of the workfunction difference of the two metal capacitor plates and the thickness of the insulator layer of the capacitor; the functional behavior can easily be calculated using the standard WKB method, as described, for example, by Schiff, Quantum Mechanics, McGraw-Hill, 1955.

When this element (whose small signal capacitance for zero DC bias is $C_2$) is placed in series with a shunt resistor-capacitor pair (values $R_1$ and $C_1$), the capacitance of the entire structure appears for low magnitude DC bias as approximately ($C_L \cong C_2C_1/C_2+C_1$). As the applied DC bias potential is raised above the magnitude $V_C$ (which allows the portion of this bias across the tunnel element to rise above $V_{C1}$), the structure capacitance appears then as $C_H = C_1$. This effect occurs since the thin dielectric capacitor appears electrically as a very low resistance conduction element once the magnitude of the bias potential across it exceeds $V_{c1}$. Two cases are had depending on the value of $R_1$. The cases are:

I. If $R_1 \rightarrow \infty$ the element capacitance will switch from $C_L$ to $C_H$ irreversibly and then remain at $C_H$ due to the effect of the magnitude (not polarity) of the applied bias.

II. If $R_1 = R_0$ as given by relation $(2V_{C1}/I_{acpp}) > R0 > (V_{total} - V_{C1}/I_{critical})$ where $I_{acpp}$ = peak-to-peak AC current where $V_{total}$ = maximum instantaneous potential magnitude appearing across the device $I_{critical}$ = maximum allowable current through the tunnel element without permitting element destruction, the capacitance of the structure will switch from $C_L$ to $C_H$ as the bias potential exceeds $V_C$ (independent of polarity) and will return to $C_L$ as the applied voltage is brought lower to $V_C$ in a reversible manner.

Figure 2:
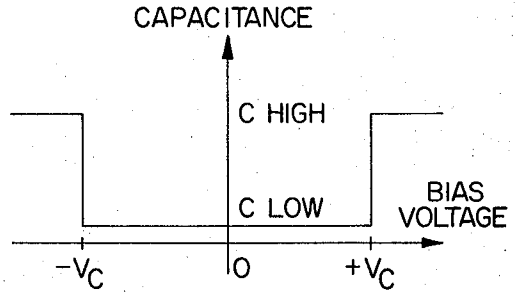
FIG. 2 illustrates graphically the capacitor-bias voltage characteristic exhibited by such structure.
Figure 3:
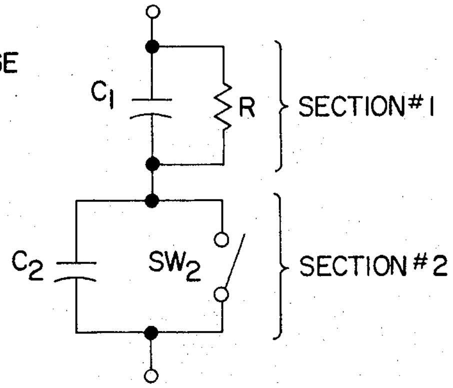
FIG. 3 illustrates a circuit equivalent to the structure of FIG. 1 useful in explaining the invention.

FIG. 1 shows a device exhibiting the aforementioned effects whereas FIG. 3 illustrates an equivalent circuit useful in explaining the operation of the device. FIG. 2 illustrates the switching capacitance characteristic achieved with the switch S closed and connecting the resistor R in circuit with the device. In FIG. 2, the bias potential is plotted as the abscissa and the capacitive values as the ordinate.

A metal-oxide-metal-oxide-metal (MOMOM) capacitor structure of the type shown in FIG. 1 was fabricated as follows. The substrate used consisted of a slice of 99.999 percent pure aluminum. Oxide No. 1 was grown on the substrate in the following manner:

a. A solution of 3 percent reagent grade d-tartaric acid and 97 percent distilled demineralized water was mixed with reagent grade $NH_4OH$ until the pH of the resulting solution was 5.5.

b. Two aluminum electrodes were partially immersed in the solution.

c. A potential difference of approximately 75 volts was placed across the two electrodes. The anode was the substrate while the cathode aluminum was also of comparably high purity.

d. The current through the anodic oxidation circuit (consisting of a power supply electrode and electrolytic solution) was monitored and the potential difference was removed after this current was below 0.5 milliamperes.

e. The substrate, anode, was then removed from the solution, rinsed thoroughly in running distilled demineralized water and subsequently air dried.

Figure 4:
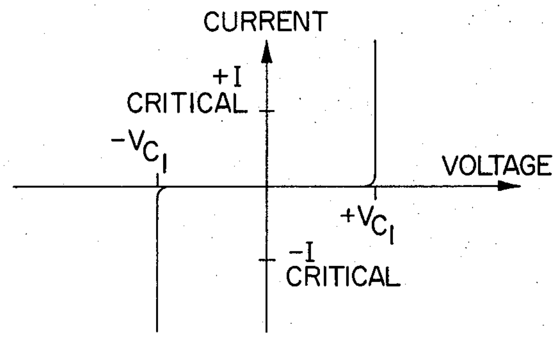
FIG. 4 illustrates graphically current-voltage characteristics of the tunneling capacitor which allow the necessary effect.

Oxide No. 2 was grown in an oxygen atmosphere at elevated temperature to a thickness of 50–100A. The oxides having been produced, the substrate was placed in a vacuum system and pumped down to $5 \times 10^{-5}$ Torr. A series of metal counter electrodes was then vapor deposited through a stainless steel mask onto each oxide. Device small signal capacitance was measured as a function of direct current bias potential difference placed across the entire device by means of a metal counter electrode. The results of the test are depicted in FIG. 2. It must be noted at this time that as one increases the bias potential difference past $V_C$ the capacitance value switches from the low value to the high value. Upon decrease of this bias potential past $V_C$ the capacitance switches back down from the high value to the low value as was shown in FIG. 2. The circuit model which accurately describes the effect on the basis of the physics of the device is shown in FIG. 3. In this particular figure, capacitor $C_1$ corresponds to the capacitance formed by the aluminum substrate of FIG. 1, and the aluminum electrode separated from the substrate by the anodically grown oxide. This capacitor is of a large area and determines the value of $C_{high}$. $C_{high}$ will be essentially equal to $E_1 A_1/D_1$ where $E_1$ is the dielectric constant of the oxide which is used. $A_1$ is the area of the top electrode and $D_1$ is the oxide thickness. As can be seen, both the oxide thickness and the area of top electrode can be varied to vary the value of $C_{high}$. Section 2 of the circuit shown in FIG. 3 represents the capacitor formed by the thin air grown dielectric oxide on the aluminum substrate with an aluminum electrode applied to this oxide. This capacitor has current voltage characteristics shown in FIG. 4. Below the value $V_{C1}$ this device looks circuit-wise like a relatively low loss capacitor. The value of the capacitance depends on the oxide thickness and the area of the counter electrode evaporated onto the thin oxide. If the bias voltage is raised to $V_{C1}$ of FIG. 4 and a bias current below $I_{critical}$ is allowed to flow through this aluminum structure, the device will act as a constant voltage short circuit so far as the circuit aspect is concerned. Section 2 of FIG. 3 shows a capacitor in parallel with a switch. This represents the tunneling capacitor. The capacitor value is determined as is mentioned above by both the thin oxide thickness and the area of the counter electrode deposited on that thin oxide and is, in fact, essentially equal to $E_2A_2/D_2$ where $E_2$ is equal to the dielectric constant of the thin oxide. $A_2$ is the area of the counter electrode and $D_2$ is the thickness of the thin oxide. It must be remarked at this point that in order to obtain current voltage characteristics as are shown in FIG. 4, the oxide thickness must be in the neighborhood of less than 50A, otherwise tunneling current will not flow and such a current voltage characteristic will not obtain. The thin oxide is characterized in Section 2 of FIG. 3 as a capacitor shunted by an open switch until $V_{C1}$ appears across this particular section. With bias voltage equal to or greater than $V_{C1}$ and a small current flowing through the device, the device acts as though the switch in the circuit model is closed. Hence, we have essentially a short circuit in this case with a $V_{C1}$ voltage appearing across it in order to sustain the short circuit. One must allow, as was mentioned above, a current to flow and this value will be below $I_{critical}$. In order to allow this current to flow, capacitor $C_1$ of Section 1 of FIG. 3 is shunted by a resistor, the value of which is determined by the current that is necessary to flow through the device of Section 2 in order to bias it into the short circuit region. A resistance relation for this resistor is given as follows:

$$R = (V_{max} - V_{C1})/(I_{critical})$$

where $V_{max}$ is the largest voltage magnitude which will ever be placed across the entire structure, $V_{C1}$ is the critical voltage of the thin tunneling capacitor, and $I_{critical}$ is the current through the tunneling capacitor. Any value above this critical current will destroy the tunneling capacitor. One embodiment of the present invention is the use of both of these capacitors, that is, the thick and thin film tunneling capacitors, in series along with a resistor to produce a capacitor, the small signal value of which switches with the bias potential applied.

Figure 5:
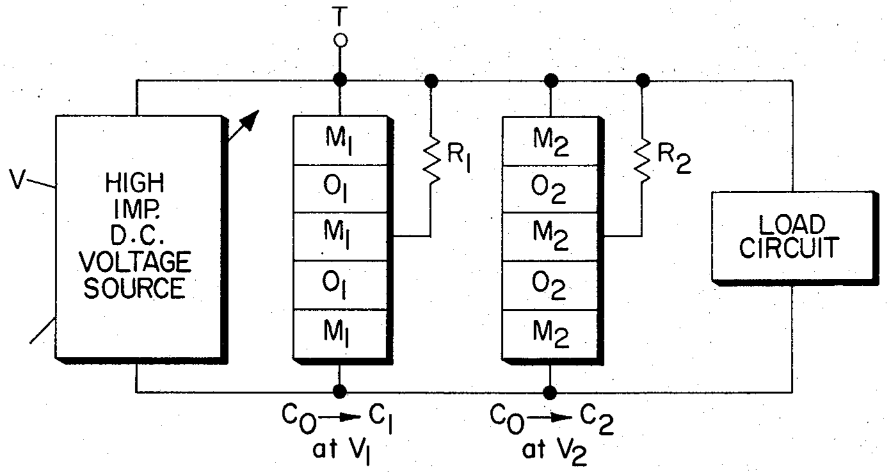
FIG. 5 illustrates a parallel arrangement of structures useful in producing a multistep change in capacitance value in accordance with the present invention.

Referring to FIG. 5, there is shown an arrangement for coupling two devices as shown in FIG. 1 across a common load circuit and common bias voltage source. As the magnitude of the bias voltage remains at zero and up to but not including $V_1$, the overall or net capacitance value of the two circuits equal $C_{01}$ plus $C_{02}$, i.e., the sum of the tunneling capacitance values of the $M_1O_1M_1$ and $M_2O_2M_2$ device portions since $C_1$ is dimensioned to be much greater than $C_{01}$ and $C_2$ is dimensioned to be much greater than $C_{02}$. As the bias voltage reaches $V_1$ and moves up to but not including $V_2$, the net capacitance value is $C_{02} + C_1$. As the voltage reaches $V_2$ and exceeds it, the net capacitance value becomes $C_1 + C_2$.

Figure 6A:
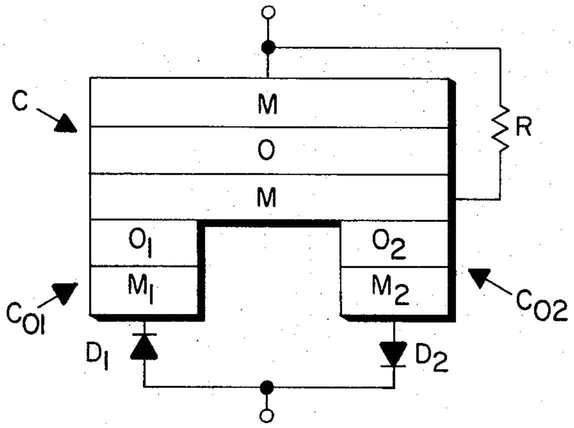
FIG. 6*a* illustrates a structure consisting of a common MOM section connected to separate tunneling $MO_1M_1$ and $MO_2M_2$ sections which are placed in series with oppositely poled unidirectional devices $D_1$ and $D_2$.
Figure 7A:
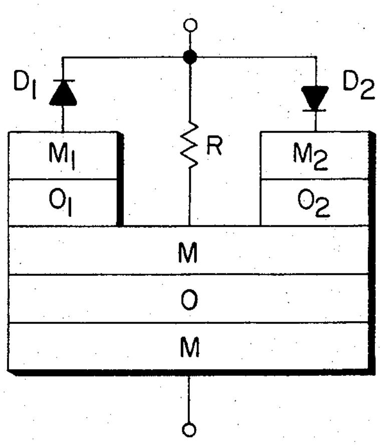
FIG. 7*a* illustrates a structure consisting of separate $M_1O_1M$ and $M_2O_2M$ structures in series with oppositely poled unidirectional devices $D_1$ and $D_2$ and connected to a common MOM section.
Figure 6B:
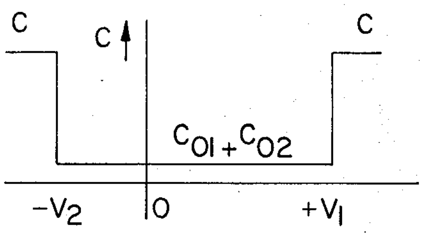
FIG. 6*b* illustrates graphically the capacitor-bias voltage characteristic exhibited by such structure as shown in FIG. 6*a*.
Figure 7B:
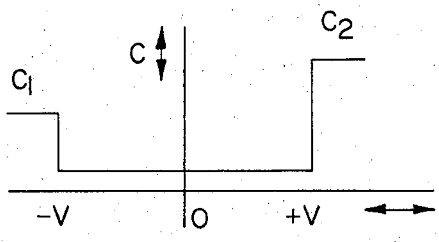
FIG. 7*b* illustrates graphically the capacitor-bias voltage characteristic exhibited by such structure as shown in FIG. 7*a*.

Referring to FIG. *6a*, there is shown an arrangement in which two tunneling capacitors comprising $MO_1M_1$ and $MO_2M_2$ are connected through respective and oppositely poled unidirectional devices $D_1$ and $D_2$ to one terminal of an applied bias supply. These devices are, in turn, coupled through a common MOM capacitor in parallel with a resistor R to the other terminal of an applied bias supply. This arrangement results in a net capacitance value characteristic such as that shown in FIG. *6b*. The capacitance value stays at a relatively low value for a bias potential which ranges between $+V_1$ and $-V_2$. As the potential $+V_1$, the voltage switches to a given high capacitance value. For a different bias potential, namely $-V_2$, the capacitance value also switches to this relatively high capacitance value. The arrangement of FIG. 6, therefore, provides capacitance value switching between two given levels for different applied voltages, namely $+V_1$ and $-V_2$.

The arrangement of FIG. *7a* shows the two capacitive devices $M_1O_1M$ and $M_2O_2M$ connected through respective unidirectional conducting devices $D_1$ and $D_2$ across a common resistor R and to one terminal of an applied voltage source. The diodes are oppositely poled. The other terminal, in effect, of these two aforementioned devices is connected through a common MOM capacitor to the other terminal of the applied voltage supply. FIG. *7b* indicates that with the arrangement of FIG. *7a* the net capacitance value of the overall arrangement is switchable between a given low capacitance value and either of two different high capacitance values $C_1$ and $C_2$ for respective applied potentials of $-V$ and $+V$.

While the invention has been particularly shown and described with respect to preferred embodiments thereof, it will be understood by those skilled in the art that changes in the form and detail may be made therein without departing from the spirit and scope of the invention.

What we claim as new and desire to secure by Letters Patent of the United States is:

1. An arrangement comprising:

first and second terminal means for applying a bias voltage to said arrangement;

a pair of capacitors each having one terminal in series with a respective unidirectional conducting device, and the series arrangements being coupled across a common resistor, said unidirectional devices being oppositely poled and coupling said capacitors to one of said first and second terminal means, the other terminals of said capacitors being coupled through a common tunneling capacitor to the other of said first and second terminal means, said tunneling capacitor having a multilayer metal-insulator-metal structure, said insulator layer being sufficiently thin to permit substantial conduction current to pass therethrough through the process of quantum mechanical tunneling upon application of a bias voltage between said first and second terminal means which is of insufficient magnitude to cause destruction of said insulator layer.

2. The arrangement of claim 1, wherein said insulator layer is of the order of 50 angstroms thick.

3. The arrangement of claim 1, wherein said common tunneling capacitor comprises a first layer of Al, a second layer of $Al_2O_3$ on said first layer, and a third layer of Al on said second layer; and said pair of capacitors comprises a pair of forth layers of $Al_2O_3$ on said first layer of Al, and a pair of fifth electrode layers of Al on said pair of forth layers, whereby said pair of capacitors and said common tunneling capacitor form a unitary structure.

4. A voltage-variable capacitance arrangement comprising:

first and second terminal means for applying a bias voltage to said arrangement;

a pair of tunneling capacitors each having one terminal in series with a respective unidirectional conducting device, said unidirectional devices being oppositely poled and coupled said capacitors to one of said first and second terminal means;

the other terminals of said tunneling capacitors being coupled through a common capacitor to the other of said first and second terminal means, and a resistance means being coupled in parallel to said common capacitor;

said tunneling capacitors each having a multilayer metal-insulator-metal structure, said insulating layer being sufficiently thin to permit substantual conduction current to pass therethrough through the process of quantum mechanical tunneling upon application of a bias voltage between said first and second terminal means which is of insufficient magnitude to cause destruction of said insulator layer.

5. The arrangement of claim 4, wherein the insulator layer of each of said tunneling capacitors is of the order of 50 angstroms thick.

6. The arrangement of claim 4, wherein the metal layers of the tunneling capacitors are such that the difference in workfunctions of the two metal layers of one tunneling capacitor is not equal to the corresponding difference for the other capacitor, whereby the threshold voltages for tunneling conduction for the two tunneling capacitors differ.

7. The arrangement of claim 4, wherein said common capacitor comprises a first layer of Al, a second layer of $Al_2O_3$ on said first layer, and a third layer of Al on said second layer; and, said tunneling capacitors each comprise a first tunneling layer of $Al_2O_3$ on said first layer of Al, and a second electrode layer of Al on said first tunneling layer, whereby said common capacitor and said tunneling capacitors form a unitary structure.

8. An arrangement comprising:

first and second terminal means for applying a bias voltage to said arrangement, first and second tunneling capacitors each having one terminal connected to one of said first and second terminal means, the other terminals of said first and second tunneling capacitors being coupled through respective first and second capacitors to the other of said first and second terminal means, and first and second resistance means being coupled in parallel with said first and second capacitors, respectively, said first and second tunneling capacitors each comprising a multilayer metal-insulator-metal structure, said insulator layer being sufficiently thin to permit substantial conduction current to pass therethrough through the process of quantum mechanical tunneling upon application of a bias voltage between said first and second terminal means which is insufficient in magnitude to cause destruction of said insulator layer.

9. The arrangement of claim 8, wherein the insulator layer of each of said tunneling cacapacitors is of the order of 50 angstroms thick.

10. The arrangement of claim 8, wherein the difference in workfunction of the metal layers of said first tunneling capacitor is greater than the difference in workfunction of the metal layers of said second tunneling capacitor, whereby the threshold voltages for tunneling conduction for the two tunneling capacitors differ.

* * * * *